United States Patent
Martin (10) Patent No.: US 9,483,788 B2
(45) Date of Patent: Nov. 1, 2016

(54) SYSTEM AND METHOD FOR GRAPHICALLY BUILDING WEIGHTED SEARCH QUERIES

(71) Applicant: Overstock.com, Inc., Salt Lake City, UT (US)

(72) Inventor: James Martin, Salt Lake City, UT (US)

(73) Assignee: Overstock.com, Inc., Salt Lake City, UT (US)

(*) Notice: Subject to any disclaimer, the term of this patent is extended or adjusted under 35 U.S.C. 154(b) by 0 days.

(21) Appl. No.: 13/926,153

(22) Filed: Jun. 25, 2013

(65) Prior Publication Data

US 2014/0379528 A1 Dec. 25, 2014

(51) Int. Cl.
G06Q 30/06 (2012.01)
G06F 17/30 (2006.01)
G06Q 30/02 (2012.01)

(52) U.S. Cl.
CPC ..... *G06Q 30/0625* (2013.01); *G06F 17/30964* (2013.01); *G06Q 30/0254* (2013.01)

(58) Field of Classification Search
CPC .................................................. G06Q 30/0625
USPC ...................................................... 705/26.62
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

Chen, M. (2007). Knowledge assisted data management and retrieval in multimedia database systems (Order No. 3268643). Available from ProQuest Dissertations & Theses Global. (304712436). pp. 19-20. Retrieved from http://search.proquest.com/docview/304712436?accountid=14753.*

(Continued)

*Primary Examiner* — Kathleen Palavecino
*Assistant Examiner* — Brittany Bargeon
(74) *Attorney, Agent, or Firm* — Clayton, Howarth & Cannon, P.C.

(57) ABSTRACT

A system and method allows a user to define a search request by selecting and weighting graphical icons provided on a search creation interface. The graphical icons may be selected by using an icon selection feature provided on the search creation interface. The graphical icons may further be assigned relative search weights using an icon weighting feature provided on the search creation interface. The system and method generates search results based on metadata associated with the selected ones of the graphical icons and the search weights assigned to each of the selected ones of the graphical icons. The search results may comprise a ranked list of items, such as products listed for sale on an e-commerce server.

22 Claims, 8 Drawing Sheets

(56) References Cited

U.S. PATENT DOCUMENTS

| | | |
|---|---|---|
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,410 B1 | 4/2002 | Noguchi et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,718,536 B2 | 4/2004 | Dupaquis |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,043,450 B2 | 5/2006 | Velez et al. |
| 7,069,242 B1 | 6/2006 | Sheth et al. |
| 7,076,453 B2 | 7/2006 | Jammes et al. |

(56) References Cited

U.S. PATENT DOCUMENTS

| | | |
|---|---|---|
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 | 8/2007 | Beck et al. |
| 7,340,249 B2 | 3/2008 | Moran et al. |
| 7,349,668 B2 | 3/2008 | Ilan et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,401,025 B1 | 7/2008 | Lokitz |
| 7,454,464 B2 | 11/2008 | Puthenkulam et al. |
| 7,493,521 B1 | 2/2009 | Li et al. |
| 7,496,582 B2 | 2/2009 | Farnham et al. |
| 7,552,067 B2 | 6/2009 | Nephew et al. |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,912,748 B1 | 3/2011 | Rosenberg et al. |
| 7,983,950 B2 | 7/2011 | DeVita |
| 8,112,303 B2 | 2/2012 | Eglen et al. |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0051996 A1 | 12/2001 | Cooper et al. |
| 2002/0002513 A1 | 1/2002 | Chiasson |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0042738 A1 | 4/2002 | Srinivasan et al. |
| 2002/0099602 A1 | 7/2002 | Moskowitz et al. |
| 2002/0107718 A1 | 8/2002 | Morrill et al. |
| 2002/0120537 A1 | 8/2002 | Morea et al. |
| 2002/0129282 A1 | 9/2002 | Hopkins |
| 2002/0147625 A1 | 10/2002 | Kolke |
| 2002/0161648 A1 | 10/2002 | Mason et al. |
| 2002/0198784 A1 | 12/2002 | Shaak et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0035138 A1* | 2/2003 | Schilling ............... G06Q 10/087 358/1.15 |
| 2003/0036914 A1 | 2/2003 | Fitzpatrick et al. |
| 2003/0041008 A1 | 2/2003 | Grey et al. |
| 2003/0046149 A1 | 3/2003 | Wong |
| 2003/0069740 A1 | 4/2003 | Zeidman |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0110100 A1 | 6/2003 | Wirth, Jr. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0044563 A1 | 3/2004 | Stein |
| 2004/0055017 A1 | 3/2004 | Delpuch et al. |
| 2004/0078388 A1 | 4/2004 | Melman |
| 2004/0117242 A1 | 6/2004 | Conrad et al. |
| 2004/0128183 A1 | 7/2004 | Challey et al. |
| 2004/0128320 A1 | 7/2004 | Grove et al. |
| 2004/0172379 A1 | 9/2004 | Mott et al. |
| 2004/0174979 A1 | 9/2004 | Hutton et al. |
| 2004/0199496 A1 | 10/2004 | Liu et al. |
| 2004/0204991 A1 | 10/2004 | Monahan et al. |
| 2004/0249727 A1 | 12/2004 | Cook, Jr. et al. |
| 2004/0267717 A1* | 12/2004 | Slackman ........... G06F 17/30675 |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0060664 A1 | 3/2005 | Rogers |
| 2005/0097204 A1 | 5/2005 | Horowitz et al. |
| 2005/0120311 A1* | 6/2005 | Thrall ............... G06F 17/30867 715/811 |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0198031 A1 | 9/2005 | Pezaris et al. |
| 2005/0203888 A1 | 9/2005 | Woosley et al. |
| 2005/0262067 A1* | 11/2005 | Lee et al. ............... 707/3 |
| 2006/0009994 A1 | 1/2006 | Hogg et al. |
| 2006/0010105 A1 | 1/2006 | Sarukkai et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0259360 A1 | 11/2006 | Flinn et al. |
| 2006/0271671 A1 | 11/2006 | Hansen |
| 2007/0073641 A1 | 3/2007 | Perry et al. |
| 2007/0077025 A1* | 4/2007 | Mino ................. G06F 17/30256 386/241 |
| 2007/0078726 A1 | 4/2007 | MacDonald Korth et al. |
| 2007/0100803 A1 | 5/2007 | Cava |
| 2007/0162379 A1 | 7/2007 | Skinner |
| 2007/0192181 A1 | 8/2007 | Asdourian |
| 2007/0206606 A1 | 9/2007 | Coleman et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2008/0052152 A1 | 2/2008 | Yufik |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0288338 A1 | 11/2008 | Wiseman et al. |
| 2009/0006190 A1 | 1/2009 | Lucash et al. |
| 2009/0030755 A1 | 1/2009 | Altberg et al. |
| 2009/0106127 A1 | 4/2009 | Purdy et al. |
| 2009/0204848 A1 | 8/2009 | Kube et al. |
| 2009/0240582 A1 | 9/2009 | Sheldon-Neal et al. |
| 2009/0293019 A1* | 11/2009 | Raffel et al. ............... 715/833 |
| 2010/0094673 A1 | 4/2010 | Lobo et al. |
| 2011/0060621 A1 | 3/2011 | Weller et al. |
| 2011/0103699 A1* | 5/2011 | Ke ................. G06F 17/30265 382/209 |
| 2011/0153383 A1 | 6/2011 | Bhattacharjya et al. |
| 2011/0271204 A1 | 11/2011 | Jones et al. |
| 2013/0080426 A1* | 3/2013 | Chen et al. ............... 707/723 |
| 2013/0085893 A1* | 4/2013 | Bhardwaj ........... G06Q 30/0643 705/26.62 |
| 2013/0144870 A1* | 6/2013 | Gupta et al. ............... 707/726 |
| 2014/0032544 A1* | 1/2014 | Mathieu et al. ............... 707/728 |

FOREIGN PATENT DOCUMENTS

| | | |
|---|---|---|
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |

(56) References Cited

FOREIGN PATENT DOCUMENTS

WO     99/59283     11/1999
WO     00/25218     5/2000

OTHER PUBLICATIONS

"Mediappraise: Mediappraise Receives National Award for Web-Based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "Fast—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"OnSale: OnSale Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEPRINT%20810-489267.
"OnSale joins fray as online shopping picks up speed: Internet Booms," Computer Reseller News, Jun. 5, 1995.
Palm, Inc. Palm™ Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http:/www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rose, "Vendors strive to undo Adobe lock-hold," Computer Reseller News, Feb. 5, 1996, n 66669, p. 71(7).
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephone Online, Oct. 2, 2000, 3 pages.
Teo, "Organizational Factors of Success in Using EDIS: Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
ubid.com, "How do I Update my Address, Phone, Credit Card, Password, etc.?" printed from web.archive.org/web/20010208113903/www.ubid.com/help/topic13asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all of my bids from My Page?" pritned from web.archive.org/web/2001208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNewswire, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
2Roam, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 3, No. 3.
Anonymous, Image manipulation (image-editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Berger et al., "Random Multiple-Access Communication and Group Testing," IEEE, 1984.

(56) References Cited

OTHER PUBLICATIONS

Braganza, "Is Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business/technology editors, "Sellers Flock to OutletZoo.com as New Automatic Price Drop Method Moves Excess Inventory Online," Business Wire, Oct. 25, 1999.

Business Wire business editors/high-tech writers, "PictureWorks Technology, Inc. Expands in Real Estate Market with Adoption of Rimfire on REALTOR.com," Business Wire, Nov. 8, 1999.

Business Wire business editors/high-tech writers, "PictureWorks Technology, Inc. Shows Strong Revenue Growth in Internet Imaging Business," Business Wire, Nov. 10, 1999.

Business Wire business editors/high-tech writers, "2Roam Partners with Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase Its Products from Anywhere," Business Wire, Oct. 2, 2000.

Business Wire business editors/high-tech writers, "2Roam Drives Hertz to the Wireless Web; Number One Car Rental Company to Provide Customers Wireless Access from Any Device," Business Wire, Aug. 7, 2001.

buy.com, www.buy.com homepage, printed Oct. 13, 2004.

Chen et al., "Detecting Web Page Structure for Adaptive Viewing on Small Form Factor Devices," ACM, May 20-24, 2003.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

ICrossing, "ICrossing Search Synergy: Natural & Paid Search Symbiosis," Mar. 2007.

IEEE 100—The Authoritative Dictionary of IEEE Standard Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International Conference on System Sciences, 1996, pp. 397-406.

Lee, "AUCNET: Electronic Intermediary for Used-Car Transactions," Electronic Market—The International Journal, Dec. 1997, pp. 24-28, vol. 7, No. 4.

Live365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol.30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinity, "Build Your Weapon," PC Magazine, Apr. 24, 2011, printed from www.pcmag.com/print_article2?0,1217,a%253D3955,00.asp.

Meade, "Visual 360: a performance appraisal system that's 'fun,'" HR Magazine, 44, 7, 118(3), Jul. 1999.

\* cited by examiner

SYSTEM AND METHOD FOR GRAPHICALLY BUILDING WEIGHTED SEARCH QUERIES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure.

The present disclosure relates generally to communication networks, and more particularly, but not necessarily entirely, to systems, programs, and methods for building search queries using graphical components.

2. Description of Related Art

A "search engine" is a software tool running on a computer that allows users to search for selected electronic content. In the simplest terms, a search engine assists users in locating selected information. For example, popular search engines, such as Google, Bing, Yahoo, and others, allow users to search for desired websites on the Internet. Websites may also provide their own internal search engines that allow users to search content internal to the websites. For example, an e-commerce website may provide an internal search engine that allows users to search for desired products offered for sale on the e-commerce website.

A search engine typically provides a "front end" user interface on a user computer that allows the user to define a search query. For example, the user interface may be generated on a webpage rendered by a web browser running on the user computer. By far the most popular user interface is that of a text box, or field, that allows users to manually enter keywords. The search engine then utilizes algorithmic functions and criteria to find keyword matches in the information stored in the databases to determine a set of search results. The search engine then sorts through the results of the search and provides a prioritized, or ranked, listing of search results to the user. The various search engines differ in their methods used for determining priority or ranking. In the case of an e-commerce website, the listing of search results may be ranked or prioritized based on purchase information, that is, best selling products may be ranked highest in the search results. Alternatively, the listing of search results may be ranked based on a predicted interest of the user. The products in the search results may be ranked by other key metrics, including click count, purchase count, pricing margins, etc.

Although the use of the text box, or field, in conjunction with a traditional search interface is time tested, improvements are still being sought. For example, traditional text-based searching does not easily allow a user to search amorphous concepts. Further, traditional text-based searching does not easily allow a user to combine separate, amorphous concepts into a single search result. In addition, traditional text-based searching does not allow users to place increased emphasis or weight on individual elements used to form the search terms.

Further, while graphical search tools exists, such as Google's Image Search, these search tools return images similar to a searched image rather than using an abstract concept represented by the image.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "having," "characterized by," and grammatical equivalents thereof are inclusive or open-ended terms that do not exclude additional, unrecited elements or method steps.

Figure 1:
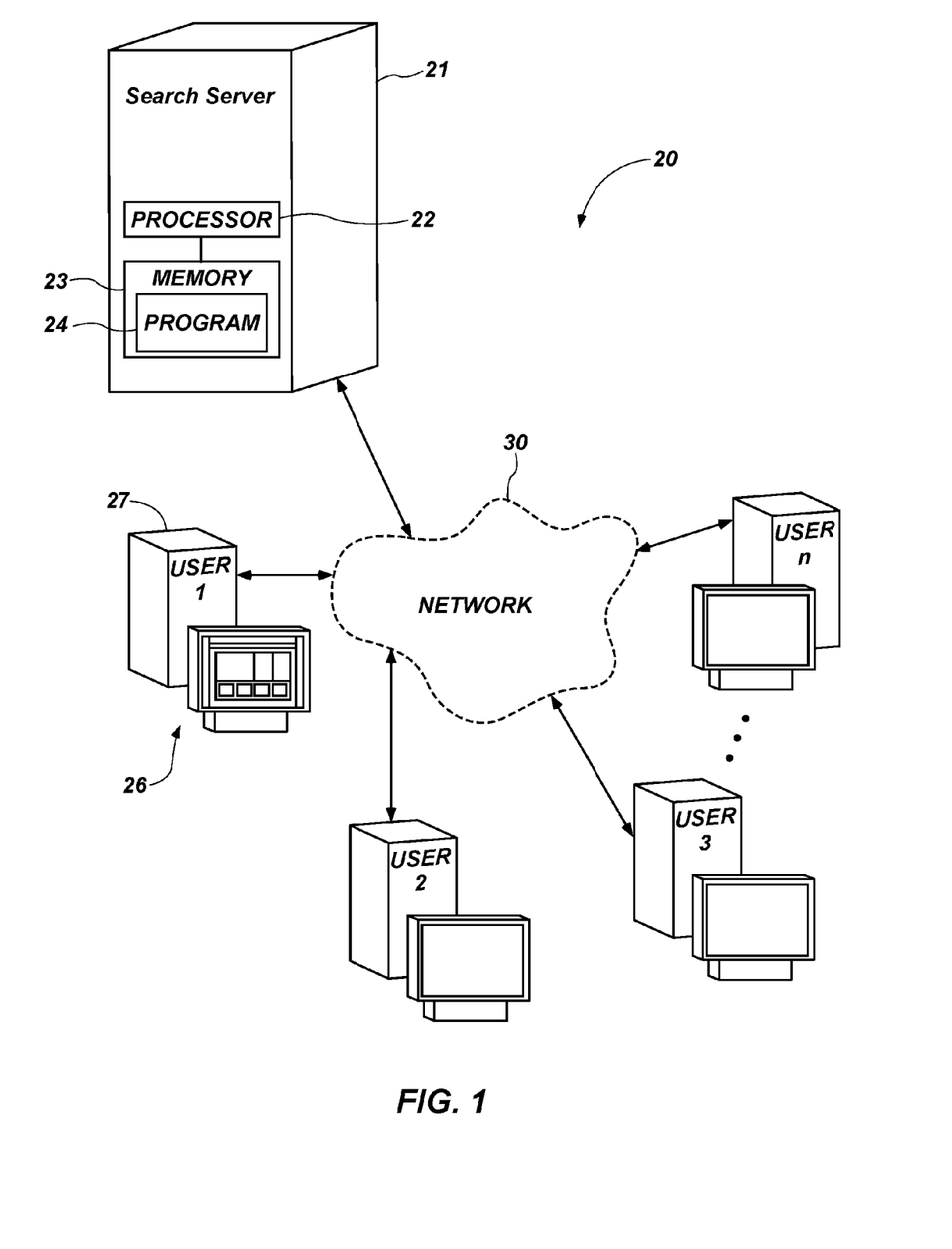
FIG. 1 is a diagram of a system according to an illustrative embodiment of the present disclosure.

Referring now to FIG. 1, there is depicted a system 20 for providing a user with a search creation interface that allows a user to define a search request using graphical icons. According to examples of embodiments of the present invention, the system 20 can be positioned to provide a search creation interface. The search creation interface may provide a set of user selectable graphical icons and an icon weighting tool. The system 20 may allow a user to define a search request by selecting one or more of the graphical icons and weighting each of the icons. The system 20 displays a ranked list of search items based on the selected ones of the graphical icons and the weighting preferences indicated by the user.

The system 20 may further include a search server 21 that includes a processor 22 and memory 23. One or more second computers, e.g., user computers 27, are positioned remotely from and in communication with the search server 21 through an electronic communication network 30, such as the Internet or other internetwork. It will be appreciated that other intervening servers, may be interposed between the search server 21 and the user computers 27.

The system 20 can also include a search engine program 24 stored on a tangible computer medium, such as, for example, one or more various types of memory, such as, for example, memory 23 of the server 21. The program 24 may contain instructions, that when executed by the processor 22, cause the server 21 to generate a search creation interface on displays of the user computers 27.

The system 20 can also include a plurality of database servers (not shown) that warehouse data regarding e-commerce conducted through the system 20. For example, the database servers may manage one or more databases stored on electronic storage media. The databases may contain various data useful to the system 20, including graphical icons, metadata, and items. It will be appreciated that the items can include any items that can be returned in a ranked search result, including, but not limited to, product listings and products.

As understood by those skilled in the art, the memory 23 of the server 21 can include volatile and nonvolatile memory known to those skilled in the art including, for example, RAM, ROM, and magnetic or optical disks, just to name a few. It should also be understood by those skilled in the art that, although illustrated as a single server, the illustrated configuration of the server 21 is given by way of example and that other types of servers or computers configured according to various other methodologies known to those skilled in the art can be used. The server 21 shown schematically in FIG. 1 represents a server or server cluster or server farm and is not limited to any individual physical server. The server 21 may be part of a server cluster that provides an e-commerce website accessible from user computers 27. The server site may be deployed as a server farm or server cluster managed by a server-hosting provider. The number of servers and their architecture and configuration may be increased based on usage, demand and capacity requirements for the system 20.

Similarly, the database servers (not shown) each represent a server or server cluster or server farm and are not limited to any individual physical server or configuration. As also understood by those skilled in the art, user computers 27 in these embodiments can be a devices, laptop, desktop, personal digital assistants or PDAs, cell phones, servers, computers, smart phones, internet enabled devices, or other types of computers and electronic devices.

As known and understood by those skilled in the art, the network 30 can include an internet or world wide web of a plurality of computers/servers in communication with one or more other computers through a communication network, and/or portions of a local or other area network.

As further understood by those skilled in the art, the program 24 can be in the form of microcode, programs, routines, and symbolic languages that provide a specific set for sets of ordered operations that control the functioning of the hardware, e.g., processor, and direct its operation, as known and understood by those skilled in the art. The program 24, according to an embodiment of the present invention, also need not reside in its entirety in volatile memory, but can be selectively loaded, as necessary, according to various methodologies as known and understood by those skilled in the art. As further understood by those skilled in the art, the term "computer-readable medium" encompasses distribution media, intermediate storage media, execution memory of a computer, and any other medium or device capable of storing the program 24 implementing the functionality or processes of various embodiments of the present invention for later reading by a computer.

The program 24 can be copied from the computer-readable medium to a hard disk or a similar intermediate storage medium. When the program 24, or portions thereof, are to be run, it can be loaded either from their distribution medium or their intermediate storage medium into the execution memory of the computer, configuring the computer to act in accordance with the functionality or method of various embodiments this invention. All such operations are well known to those skilled in the art of computer systems.

According to an exemplary embodiment of the present invention, the program 24 can include a set of instructions that, when executed by the processor 22, cause the server 21 or processor 22, to perform the operations of: (i) generate a search creation interface on a display of a user electronic device, the search creation interface providing a set of graphical icons, an icon selection tool, and an icon weighting tool, (ii) process user input acquired through user interaction with the icon selection tool to define selected ones of the graphical icons from the set of graphical icons, (iii) process user input acquired through user interaction with the icon weighting tool to define a search weighting preference for each of the selected ones of the graphical icons, (iii) process the selected ones of the graphical icons to generate a ranked item list for each of the selected ones of the graphical icons, (iv) process the search weighting preferences and the ranked item lists for the selected ones of the graphical icons to generate a weighted ranked item list for each of the selected ones of the graphical icons, (v) process the weighted ranked item lists for the selected ones of the graphical icons to form a combined ranked item list, and (vi) display the combined ranked item list on the display of the user electronic device.

Figure 2A:
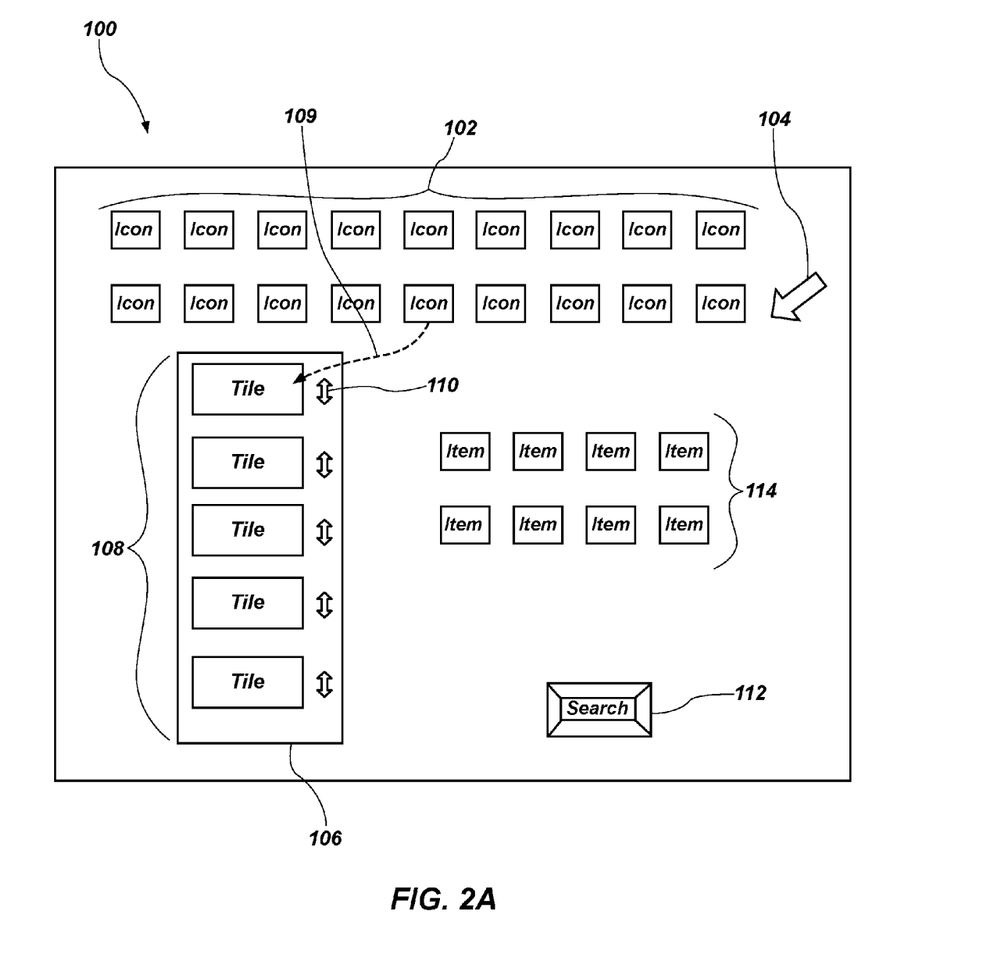
FIG. 2A is a schematic representation of an exemplary search creation interface generated on a display of a user device according to an illustrative embodiment of the present disclosure.

Referring now to FIG. 2A, there is depicted an exemplary search creation interface 100 according to an illustrative embodiment of the present disclosure. In an illustrative embodiment, the search creation interface 100 may be generated by the server 21 on a display of the user devices 27. For example, the user devices 27 may request the search creation interface 100 from the server 21. The search creation interface 100 may be displayed in web browsers running on the user devices 27. In an embodiment, the search creation interface 100 may be generated by an application, or "app," running on the user devices 27. That is, the search creation interface 100 is generated by the processors of the user devices 27 based on the application running on the user devices 27.

In an illustrative embodiment, the search creation interface 100 may display a set of graphical icons 102 to the user on the user devices 27. In an illustrative embodiment, the graphical icons 102 may be stored as digital images, or as digital image files. In an illustrative embodiment, the graphical icons 102 are stored as one of PNG, JPEG, and GIF file formats. The icons 102 may comprise user perceivable images which symbolically represent a conceptually related set of items. For example, each of the set of graphical icons 102 may convey a different concept or idea to the user. The graphical icons 102 may comprise or represent any item, object, or concept to a user that may be displayed visually, including themes, scenes, activities, sports, landscapes, characters, avatars, art, images, real estate, products, abstract ideas, movies, furniture, etc.

In an illustrative embodiment, each of the graphical icons 102 may have associated therewith unique metadata stored in a database accessible to the server 21 of the system 20. The metadata may be utilized in searches defined by the selected ones of the graphical icons 102. In an embodiment, the metadata may include seed items associated with the icons 102. The seed items may be manually selected by an operator of the server 21. In an illustrative embodiment, the seed items may be automatically selected by the server 21. The seed items may be related to the archetypes, or concepts, conveyed by the icons 102. In an illustrative embodiment, the seed items may be products, or product listing information, offered for sale on an e-commerce website. In an illustrative embodiment, the metadata may be keywords associated with the graphical icons 102. In an illustrative embodiment, the metadata may be comprise one or more categories of a product taxonomy. It will be appreciated that the seed items may be utilized to generate other related items.

In an illustrative embodiment, the metadata may be used to generate a list of ranked items for each of the selected ones of the graphical icons 102. It will be appreciated that the list may be generated by conducting a search of an item database accessible to the server 21. The search may be conducted using any suitable search algorithm as is known to one having ordinary skill. The ranking of the items may be according to any suitable ranking algorithm, including user popularity, click counts, best sellers, profit margin, user rating, price, features, user base, inventory, or any other ranking method known to those having ordinary skill. The ranking algorithm may include release date, author, performer, actor, melting point, solubility, country of origin, bond strength, passenger size, or horsepower. Thus, each item returned in a list may have an associated numerical ranking relative to the other items in the list.

The search creation interface 100 may provide an icon selection tool 104 that allows users to select ones of the graphical icons 102. The icon selection tool 104 may include a pointer to latch onto an icon 102 on the display and move it to another location. In an illustrative embodiment, the icon selection tool 104 may allow a user to click and drag preferred ones of the graphical icons 102 into a search creation workspace 106 provided by the search creation interface 100. In this regard, the search creation workspace 106 may provide a plurality of tiles 108. Using the icon selection tool 104, a user may click onto a selected one of the icons 102 and drag it and drop it onto one of the tiles 108 as shown by the arrow marked with reference numeral 109. The selected one of the icons 102 will then be displayed in the appropriate one of the tiles 108. In an illustrative embodiment, the icon selection tool 104 may include a pointing device that allows a user to click check boxes associated with the graphical icons 102. In an illustrative embodiment, the icon selection tool 104 may include a double-click selection feature. That is, a user may select one of the graphical icons 102 by double clicking on the selected one. Thus, it will be appreciated that the icon selection tool 104 may include any interface feature that allows users to select preferred ones from the set of graphical icons 102.

The search creation interface 100 may further provide an icon weighting tool 110 that allows users to weight the selected ones of the graphical icons 102. In an illustrative embodiment, the icon weighting tool 100 allows a user to adjust the relative display sizes of the selected ones of the graphical icons in the search creation workspace 106. For example, the icon weighting tool 110 may allow a user to click and drag a slider associated with one of the selected ones of the graphical icons 102 to adjust its relative size, proportionally, to the other selected ones of the graphical icons 102. In an illustrative embodiment, the proportionality of the sizes of the selected ones of the graphical icons 102 may determine the weight accorded to each of the selected ones of the graphical icons 102 during a database search. For example, a select one of the graphical icons 102 having a display size twice as large as another one of the selected graphical icons 102 may be weighted twice as much in a search. Thus, it will be appreciated that the icon weighting tool 110 may allow a user to adjust the relative size ratios of the selected ones of the graphical icons 102. In an illustrative embodiment, when a user adjusts one of the display sizes of the selected ones of the graphical icons 102, the display sizes of the other ones of the selected ones of the graphical icons 102 may automatically be adjusted proportionally.

In an illustrative embodiment, the icon weighting tool 110 may include one or more graphical slider bars that allow a user to weight each of the selected ones of the graphical icons 102. In an illustrative embodiment, the icon weighting tool 110 allows a user to fill in, using a key board, the proportional weights accorded to each of the selected ones of the graphical icons 102. Thus, it will be appreciated that the icon weighting tool 110 includes any feature that allows a user to assign search weights to the selected ones of the graphical icons 102. The search creation interface 100 may further provide a virtual button 112 that initiates a search defined by the user through the search creation interface 100. In particular, once the user has defined a desired search using the icon selection tool 104 and the icon weighting tool 110 provided by the interface 100, a user may initiate a search by selecting the button 112. It will be appreciated that the virtual button 112 is simply one means of triggering the search, and that other triggers exist to trigger the search that fall within the scope of the present disclosure. The server 21 performs the search, and returns weighted search result items 114 to the user device 27 in a manner as is described below.

Figure 2B:
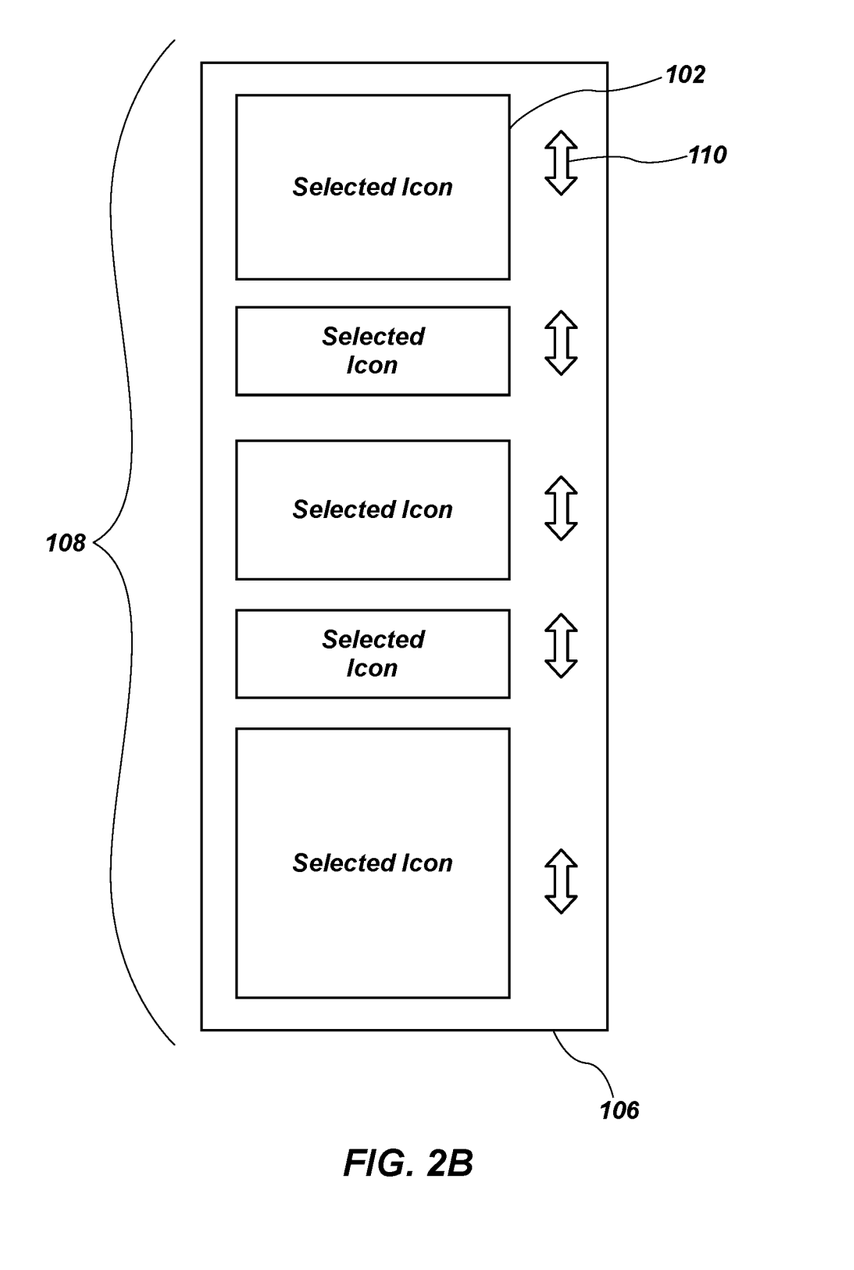
FIG. 2B is a schematic representation that depicts weighting selected graphical icons by adjusting their relative display sizes.

Referring now to FIG. 2B, where like reference numerals depict like components, the relative display sizes of selected ones of the graphical icons 102 may be adjusted relative to each other. In particular, the relative display sizes may be varied by a user using the icon weighting tool 110. In an illustrative embodiment, the icon weighting tool 110 may allow a user to click and drag the borders of the selected ones of the graphical icons 102 to adjust their display sizes. The relative display sizes may determine the weight given to each of the selected ones of the graphical icons 102 in a search request. For example, a selected one of the graphical icons 102 having a display size twice that of another one of the selected ones of the graphical icons 102 will be given twice the weight in the search results.

In an embodiment, the icon weighting tool 110 may allow a user to list the selected ones of the graphical icons 102 in a desired order to determine weight. For example, the selected ones of the graphical icons 102 may be arranged by the user in a ranked list, having a first position, a second position, etc. The icon in the first position in the list may be weighted more than the lower ranked items in the list. The list may be vertically or horizontally arranged on the search creation interface 100. For example, the user may drag and drop the selected ones of the graphical icons 102 in the desired order on the interface 100 to define user weighting preferences. Selected ones of the graphical icons 102 may be represented more than once in the list.

Figure 3:
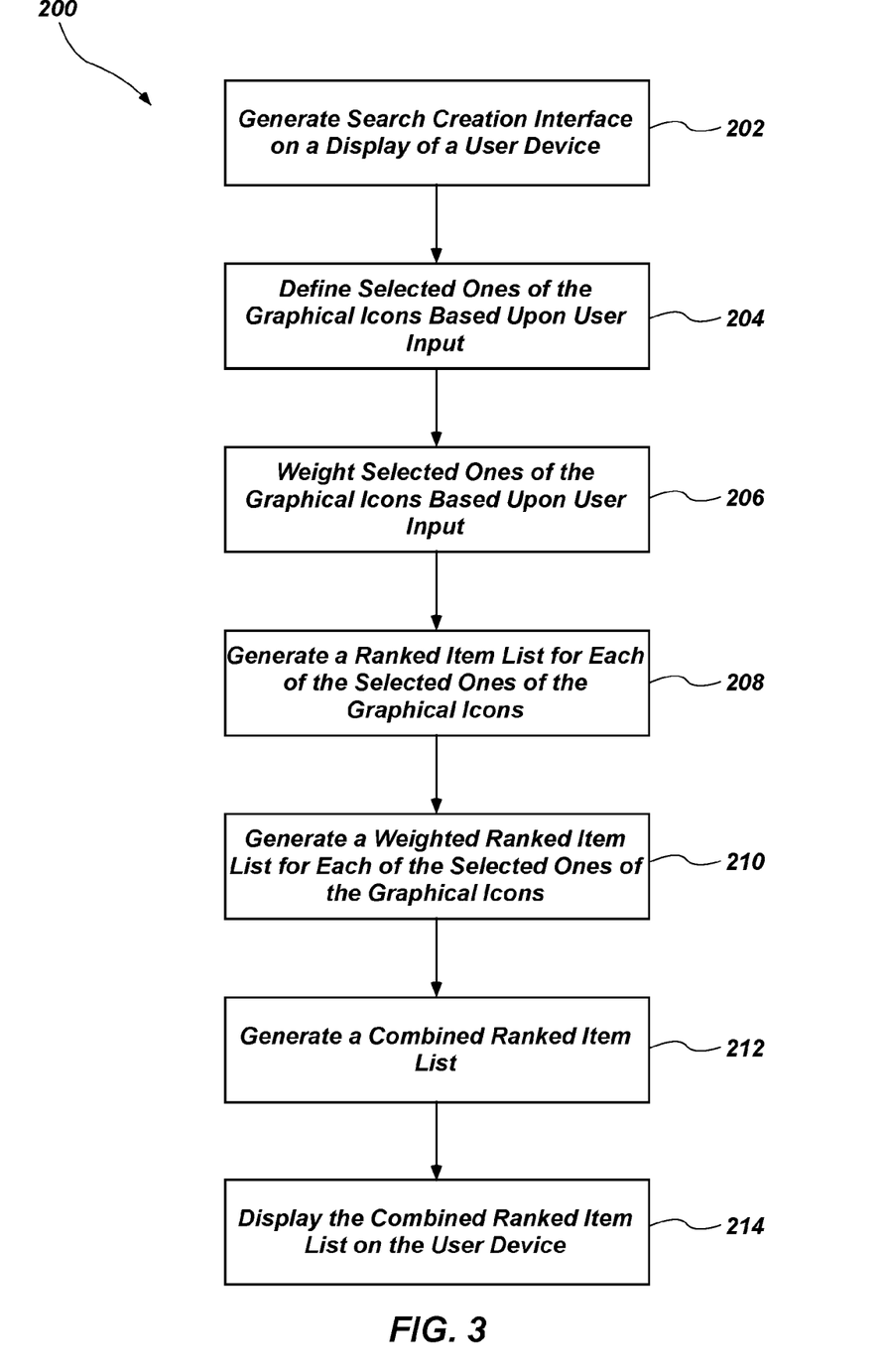
FIG. 3 depicts a flow diagram of a process according to an illustrative embodiment of the present disclosure.

Referring now to FIG. 3, there is depicted a flow diagram of a process 200 implemented by the system 20 for allowing a user to define and conduct a search according to an illustrative embodiment of the present disclosure. At step 202, the process 200 generates a search creation interface on a display of a user electronic device. The search creation interface may be a webpage displayed by a web browser program running on the user electronic device. In particular, the user electronic device may request the webpage from a website hosted by a server. In an illustrative embodiment, the website may be an e-commerce website. In an illustrative embodiment, the search creation interface may be generated by an application, or "app," running on the user electronic device. The user electronic device may be one of a laptop, desktop, personal digital assistants or PDAs, cell phones, servers, computers, smart phones, internet enabled devices, or other types of computers and electronic devices. The search creation interface may be a graphical user interface as known to those having skill in the art.

The search creation interface provides a set of graphical icons, an icon selection tool, and an icon weighting tool. The set of graphical icons may be images displayed on the display of the user device. The graphical icons may be images designed to evoke concepts and archetypes in the mind of a user. For example, the icons may each represent a different theme. The icon selection tool provides a tool for a user to select preferred ones of the set of graphical icons. The icon weighting tool provides a tool for a user to individually weight the selected ones of the graphical icons in a search request. For example, a user may weight the selected ones of the graphical icons by adjusting their relative display sizes. In this case, graphical icons with a larger display size are given more weight in a search than smaller display sizes.

At step 204, the process 200 processes user input acquired through user interaction with the icon selection tool to define selected ones of the graphical icons from the set of graphical icons. For example, a user may drag and drop selected ones of the graphical icons into a virtual workspace on the search creation interface. At step 206, the process 200 processes user input acquired through user interaction with the icon weighting tool to define a search weighting preference for each of the selected ones of the graphical icons. For example, a user may adjust a relative display size of each the selected ones of the graphical icons to define a search weighting of each of the selected ones of the graphical icons.

At step 208, the process 200 processes the selected ones of the graphical icons to generate a ranked item list for each of the selected ones of the graphical icons. In performing step 208, the process 200 may use metadata previously associated with each of the graphical icons. The metadata may be stored in a database residing on an electronic storage medium. The metadata may include seed products associated with the graphical icons. For example, if a graphical icon conveyed the concept of camping, the seed products may include a tent, a camping stove, and a sleeping bag. The seed products may be manually chosen or automatically selected by the process 200. The seed products are actual products offered for sale on an e-commerce website. Often times, the seed products are the lowest nodes in a product taxonomy. The metadata may also include keywords or search terms. For example, if a graphical icon conveyed the concept of camping, the keywords or search terms may include "tent," "camping stove," and "sleeping bag." The metadata may also include categories of a product taxonomy. For example, if a graphical icon conveyed the concept of camping, the categories of the taxonomy may be "tents," "camping stoves," and "sleeping bags." By way of another example, if a graphical icon or symbol conveyed the concept of "Action Movies," the keywords or search terms used as seeds could include "car chase," "George Lucas," "John Wayne," "academy award" and "explosion." Such terms can be provided by an operator of the system or be automatically discovered by systems external to those described in this claim.

Using the metadata, the process 200 returns a ranked list of items for each of the selected ones of the graphical icons. If the metadata are seed products, the ranked list of products may include products that are relevant to the seed products. (The ranked list of products may include the seed products.) The relevancy of other products to the seed products may be determined in wide variety of manners, including by "People who bought X also bought Y" or "People who looked for A also looked for B." The ranking of the list may be statistically determined based on key metrics, including click count, purchase count, pricing margins, etc. It will be appreciated that a ranked list for a single graphical icon may be derived using multiple seeds. It will further be appreciated that the each of the seed products may be weighted and the relevant products for each of the seed products may be combined into a single final ranked list for each graphical icon. If the metadata comprise keywords, the process 200 may conduct a search of a database using the keywords to return a ranked list of items for each of the selected ones of the graphical icons. If the metadata comprise categories of a product taxonomy, the process 200 may conduct a search of a database using the categories to return a ranked list of items for each of the selected ones of the graphical icons.

At step 210, the process 200 processes the search weighting preferences and the ranked item lists for the selected ones of the graphical icons to generate a weighted ranked item list for each of the selected ones of the graphical icons. In particular, the process 200 applies the search weighting preferences defined by the user through the search creation interface to their respective ranked item lists. This weighting step may re-rank the list. At step 212, the process 200 processes the weighted ranked item lists for the selected ones of the graphical icons to generate a combined ranked item list. Items appearing in multiple ranked item lists may receive an additional boost in their rankings.

At step 214, the process 200 displays the combined ranked item list on the display of the user electronic device. The user may select any of the ones of the items in the combined ranked item list. For example, after selecting one of the items, the user may be taken to a virtual check-out page where the user may purchase the selected one of the items from the combined ranked item list.

Example 1

Referring now to FIGS. 4-7, there is depicted an example of a process for allowing a user to define a weighted search request using graphical icons. It will be appreciated that the process may be performed by the system 20 shown in FIG. 1. For example, the processor 22 of the server 21 may perform the steps of the process shown in FIGS. 4-7.

Figure 4:
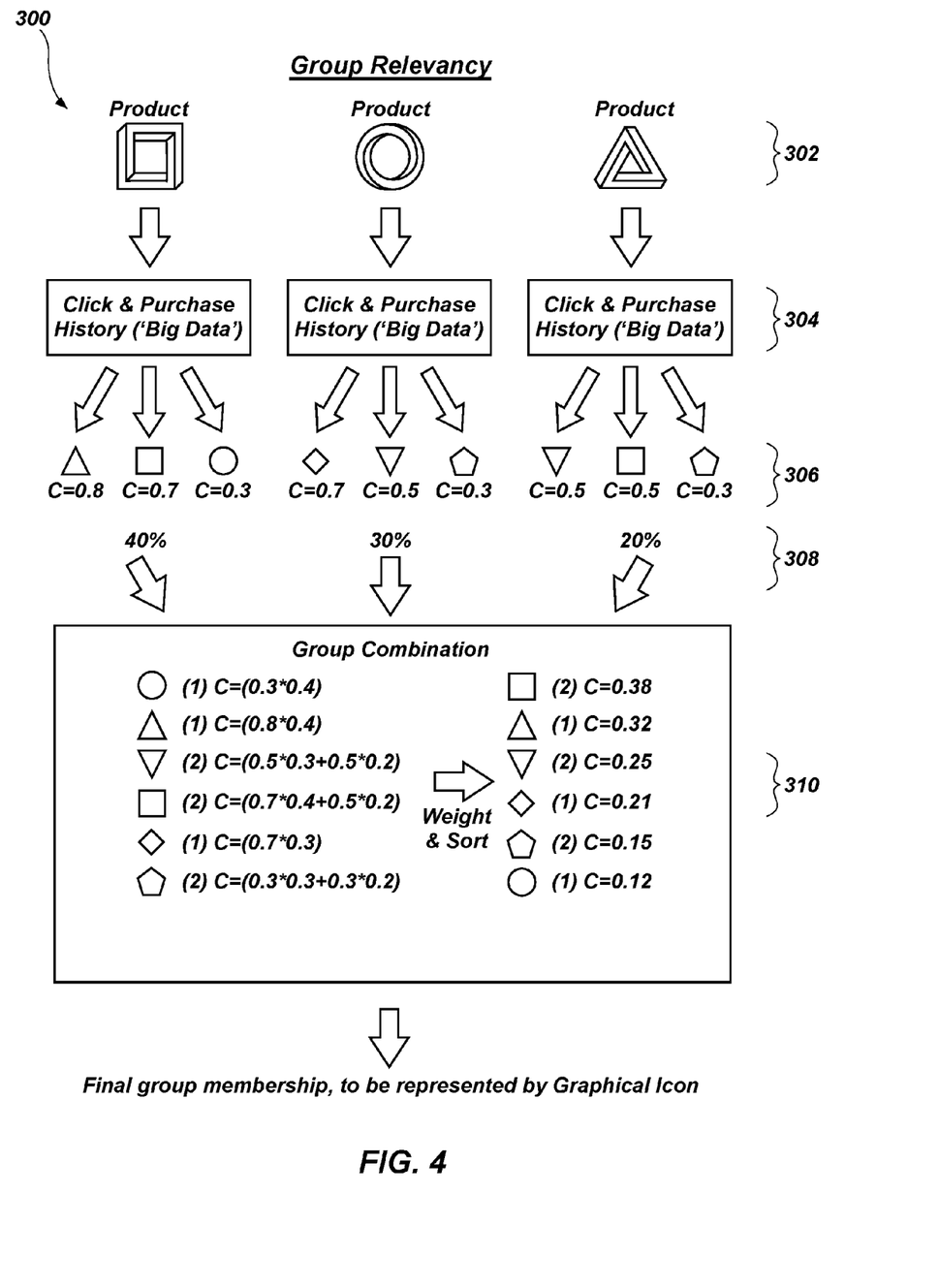
FIGS. 4-7 depict Example 1 according to an illustrative embodiment of the present disclosure.

As shown in the diagram 300 of FIG. 4, at step 302, the process utilizes seed products for generating a ranked list of products for a graphical icon. It will be appreciated that the seed products may be selected automatically or manually. Typically, the seed products should have some relationship to the concept or theme of a graphical icon. At step 304, the process uses the seed products to generate additional products. For example, the additional products may be determined based on relevancy to the seed products as described above. At step 306, the process provides groups of the additional products with rankings. The rankings may be based on a wide range of factors, including click counts, sales, user popularity, etc.

At step 308, the process combines the groups of additional products according to pre-defined weighting criteria to form a ranked product list as shown at step 310. (The weight criteria are different than the weights defined by the user using the icon weighting tool.) The pre-defined weighting criteria may allow an operator, not the user, to assign different weights to the seed products. The ranked product list may be sorted and ordered according to weighted product rankings as shown at step 310. The ranked product list shown at step 310 may be pre-defined or may be dynamically generated.

Figure 5:
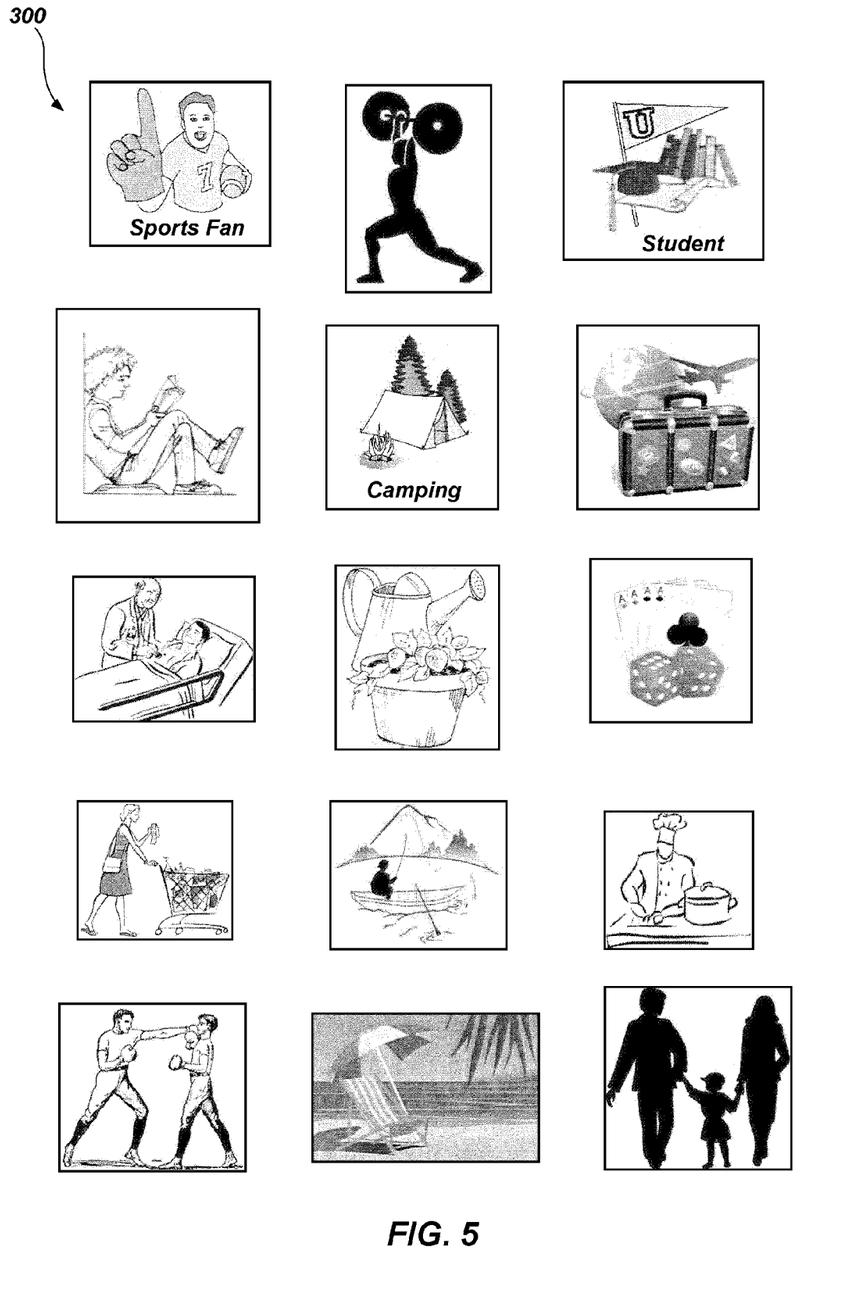

Referring now to FIG. 5, there is depicted a group of exemplary graphical icons 400 that may be utilized by the process. The icons 400 may be displayed on a search creation interface generated on a display of a user device. As can be observed, the graphical icons 400 may convey a wide range of concepts and themes to a user. Using an icon selection tool provided by the search creation interface, the process allows a user to select preferred ones of the graphical icons 400 to define a search request. For example, the icon selection tool may allow a user to drag and drop selected ones of the graphical icons 400 into a search creation workspace provided on the display of the user device.

Figure 6:
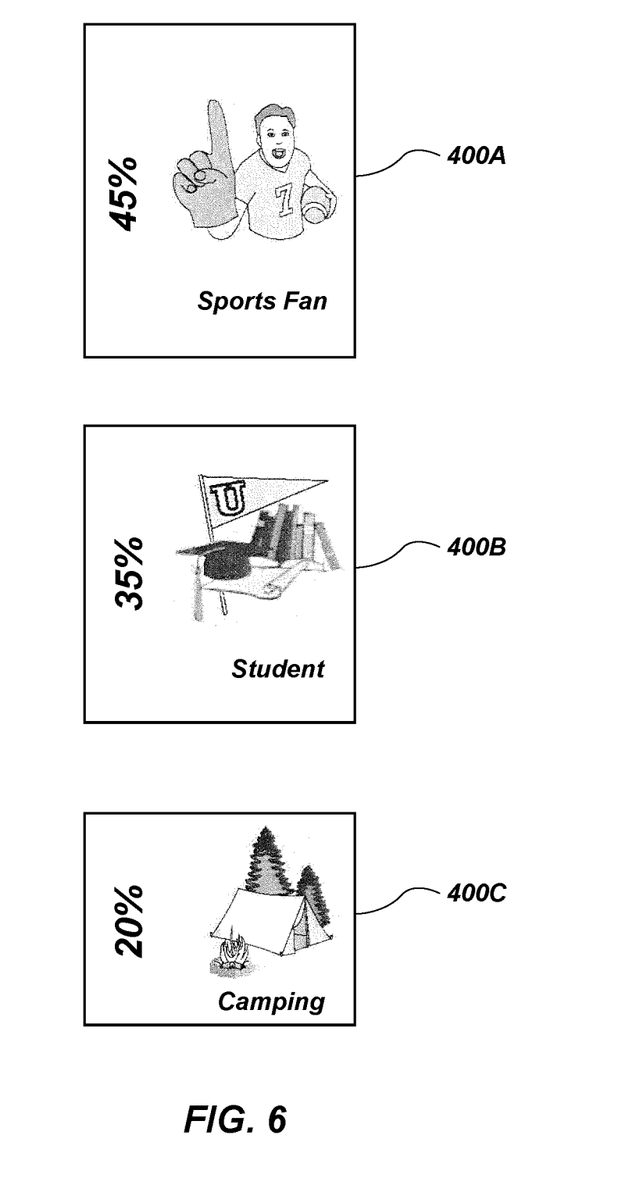

Referring now to FIG. 6, there are depicted three exemplary selected ones 400A, 400B, and 400C of the graphical icons 400 shown in FIG. 5 as they might be displayed by the process on the display of the user device. Using an icon weighting tool provided by the search creation interface, the process allows a user to adjust the relative display sizes of the selected ones 400A, 400B, and 400C of the graphical icons 400 to have the display ratios of 45%, 35%, and 20%, respectively. For example, the user may click and drag a target on the border of the selected ones 400A, 400B, and 400C of the graphical icons 400 to adjust their relative display sizes. The relative display sizes of the selected ones 400A, 400B, and 400C of the graphical icons 400 assign their weights in a search request.

Figure 7:
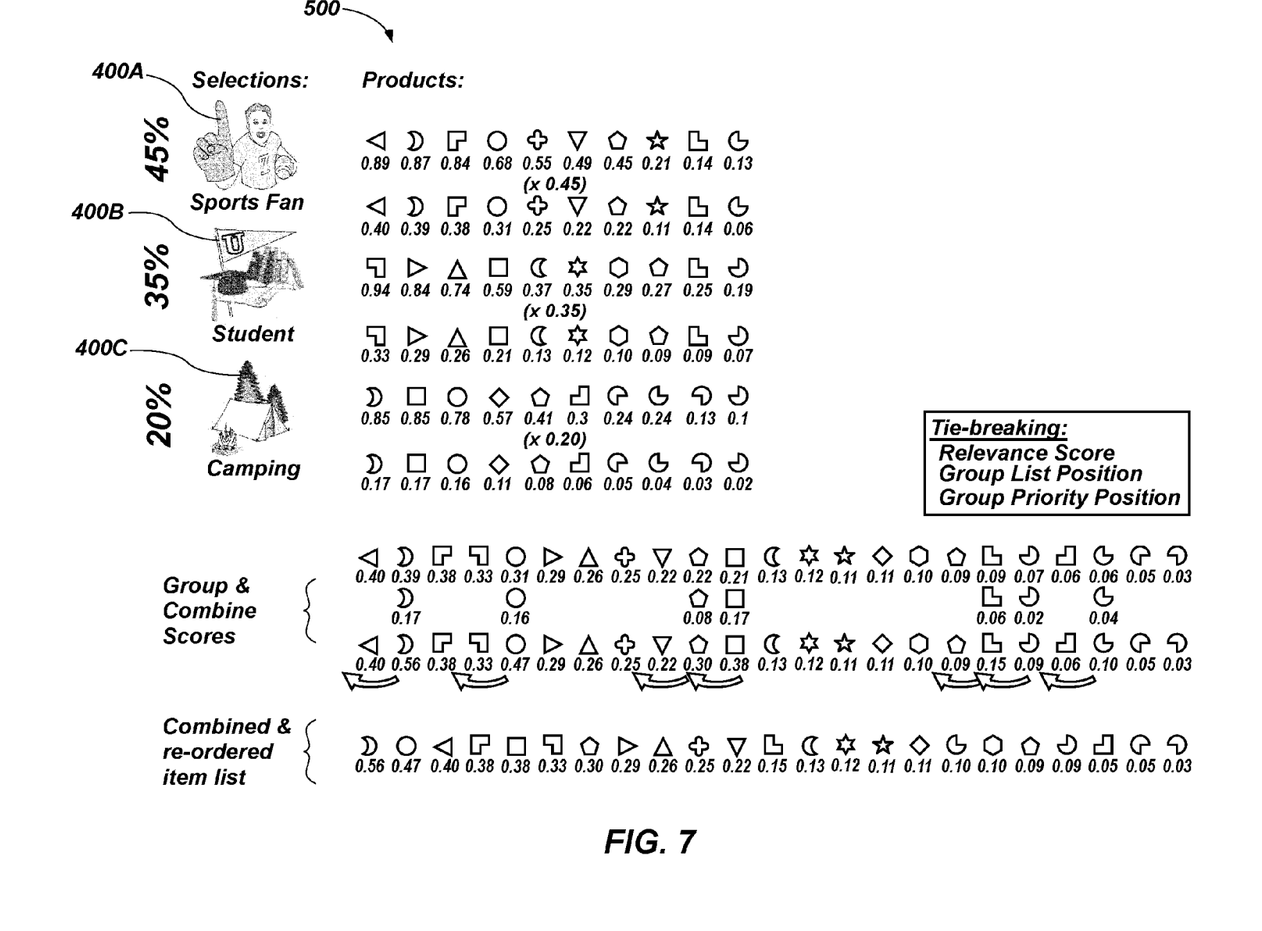

Referring now to FIG. 7, there is depicted a diagram of the process for generating search results. In particular, once a user has selected and weighted the preferred ones of the graphical icons 400, namely, icons 400A, 400B, and 400C, the user initiates a search. For each of the icons 400A, 400B, and 400C, the process returns a ranked product list determined by the process shown in FIG. 4. The ranked product lists may be pre-generated or may be generated at the time of the user defined search.

The ranked product lists of each of the icons 400A, 400B, and 400C may then be weighted by the process according the weighting preferences established by the user as shown in FIG. 6. The weighted ranked product lists of each of the icons 400A, 400B, and 400C may then be combined and re-ordered to define a combined ranked item list. The process may then display the combined ranked item list as the search results on a display of the user device. A user may then select for purchase one of the items in the search results. This is the end of Example 1.

In the drawings and specification, there has been disclosed a typical embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly, and use may be made without departing from the principles and concepts set forth herein.

The invention claimed is:

1. A method of performing an electronic search of a database, said method comprising:
    associating metadata with each of a set of graphical icons in a database;
    generating a search creation interface on a display of a user electronic device, the search creation interface providing the set of graphical icons, an icon selection tool, and an icon weighting tool;
    processing user input acquired through user interaction with the icon selection tool to define at least two selected ones of the graphical icons from the set of graphical icons;
    processing user input acquired through user interaction with the icon weighting tool to define a search weighting preference for each of the at least two selected ones of the graphical icons;
    processing the at least two selected ones of the graphical icons to generate a ranked item list for each of the at least two selected ones of the graphical icons based on the metadata, wherein the ranked item lists each comprise: items having an associated numerical ranking relative to other items in the ranked item list,
    wherein the metadata include seed products associated with corresponding graphical icons, such that the seed products are actual products offered for sale on the database, and the metadata also include at least one of click count, purchase count, and pricing margins, and
    wherein the seed products are weighted, using keywords, and combined into a single ranked list for each corresponding graphical icon, wherein the single ranked list is also used to generate the ranked item list;

processing the search weighting preferences and the ranked item lists for the at least two selected ones of the graphical icons to generate a weighted ranked item list for each of the at least two selected ones of the graphical icons, the weighted ranked item lists being generated by applying each of the search weighting preferences to the numerical rankings of the items in its associated ranked item list;

processing the weighted ranked item lists for the at least two selected ones of the graphical icons to form a combined ranked item list, the combined ranked item list being formed by grouping the items from each of the weighted rank item lists into the combined ranked item list; and displaying the combined ranked item list on the display of the user.

2. The method of claim 1, wherein the icon selection tool provides a drag and drop feature such that the user interaction with the icon selection tool comprises a user dragging and dropping selected ones of the graphical icons into a search creation workspace provided by the search creation interface.

3. The method of claim 1, wherein the user interaction with the search weighting tool defines a user preference ratio of the selected ones of the graphical icons with respect to each other, and wherein the method further comprises defining the search weighting preferences based on the user preference ratio of the selected ones of the graphical icons with respect to each other.

4. The method of claim 1, wherein the user interaction with the search weighting tool adjusts proportional display sizes of the selected ones of the graphical icons, and wherein the method further comprises defining the search weighting preferences based on the proportional display sizes of the selected ones of the graphical icons.

5. The method of claim 1, wherein the search weighting tool provides a click and drag feature such that the user interaction with the search weighting tool comprises a user clicking and dragging a virtual slider to adjust user preference ratios of the selected ones of the graphical icons with respect to each other, and wherein the method further comprises defining the search weighting preferences based on the user preference ratios of the selected ones of the graphical icons.

6. The method of claim 1, wherein the search weighting tool provides a click and drag feature such that the user interaction with the search weighting tool comprises a user clicking and dragging virtual sliders to adjust relative display sizes of the selected ones of the graphical icons, and wherein the method further comprises defining the search weighting preferences based on the relative display sizes of the selected ones of the graphical icons.

7. The method of claim 1, wherein the items are products offered for sale on an e-commerce website.

8. The method of claim 1, wherein the graphical icons comprise avatars.

9. The method of claim 1, wherein the metadata comprises keywords.

10. The method of claim 1, wherein the metadata comprises categories of a product taxonomy.

11. A system for performing an electronic search of a database, said system comprising:
a processor; and
a memory coupled to the processor;
wherein the memory has a set of computer readable instructions stored therein, that when executed by the processor, cause the processor to:
(i) generate a search creation interface on a display of a user electronic device, the search creation interface providing a set of graphical icons, an icon selection tool, and an icon weighting tool,
(ii) process user input acquired through user interaction with the icon selection tool to define at least two selected ones of the graphical icons from the set of graphical icons,
(iii) process user input acquired through user interaction with the icon weighting tool to define a search weighting preference for each of the selected ones of the graphical icons,
(iv) process the selected ones of the graphical icons to generate a ranked item list for each of the selected ones of the graphical icons based on metadata, wherein the ranked item lists each comprise: items having an associated numerical ranking relative to other items in the ranked item list,
wherein the metadata include seed products associated with corresponding graphical icons, such that the seed products are actual products offered for sale on the database, and the metadata also include at least one of click count, purchase count, and pricing margins,
(v) process the search weighting preferences and the ranked item lists for the selected ones of the graphical icons to generate a weighted ranked item list for each of the selected ones of the graphical icons, the weighted ranked item lists being generated by applying each of the search weighting preferences to the numerical rankings of the items in its associated ranked item list, and wherein the seed products are weighted, using the keywords, and combined into a single ranked list for each corresponding graphical icon, wherein the single ranked list is also used to generate the ranked item list;
(vi) process the weighted ranked item lists for the selected ones of the graphical icons to form a combined ranked item list, the combined ranked item list being formed by grouping the items from each of the weighted rank item lists into the combined ranked item list, and
(vii) display the combined ranked item list on the display of the user electronic device.

12. The system of claim 11, wherein the wherein the icon selection tool provides a drag and drop feature such that the user interaction with the icon selection tool comprises a user dragging and dropping selected ones of the graphical icons into a search creation workspace provided by the search creation interface.

13. The system of claim 11, wherein the user interaction with the search weighting tool defines a user preference ratio of the selected ones of the graphical icons with respect to each other, and wherein the set of computer readable instructions, when executed by the processor, causes the processor to define the search weighting preferences based on the user preference ratio of the selected ones of the graphical icons with respect to each other.

14. The system of claim 11, wherein the user interaction with the search weighting tool adjusts proportional display sizes of the selected ones of the graphical icons, and wherein the set of computer readable instructions, when executed by the processor, causes the processor to define the search weighting preferences based on the proportional display sizes of the selected ones of the graphical icons.

15. The system of claim 11, wherein the search weighting tool provides a click and drag feature such that the user interaction with the search weighting tool comprises a user clicking and dragging a virtual slider to adjust user preference ratios of the selected ones of the graphical icons with respect to each other, and wherein the set of computer readable instructions, when executed by the processor, causes the processor to define the search weighting preferences based on the user preference ratios the selected ones of the graphical icons.

16. The system of claim 11, wherein the search weighting tool provides a click and drag feature such that the user interaction with the search weighting tool comprises a user clicking and dragging virtual sliders to adjust relative display sizes of the selected ones of the graphical icons, and wherein the set of computer readable instructions, when executed by the processor, causes the processor to define the search weighting preferences based on the relative display sizes of the selected ones of the graphical icons.

17. The system of claim 11, wherein the items are products offered for sale on an e-commerce website.

18. The system of claim 11, wherein the graphical icons comprise avatars.

19. The system of claim 11, wherein the metadata comprise keywords.

20. The system of claim 11, wherein the metadata comprise categories of a product taxonomy.

21. The system of claim 11, wherein the graphical icons are images.

22. The system of claim 11, wherein the graphical icons represent archetypes.

* * * * *